United States Patent [19]

Shimura

[11] 3,778,070

[45] Dec. 11, 1973

[54] ROTARY SHAFT AIR-TIGHTLY FITTING DEVICE

[75] Inventor: Yoshihiro Shimura, Nakano-ku, Tokyo, Japan

[73] Assignee: Rigaku Denki Company, Ltd., Tokyo, Japan

[22] Filed: Feb. 24, 1972

[21] Appl. No.: 228,923

[30] Foreign Application Priority Data

Aug. 31, 1971  Japan.............................. 46/66344

[52] U.S. Cl.................................. 277/58, 277/134
[51] Int. Cl............................................. F16j 15/16
[58] Field of Search .................. 277/25, 58, 59, 61, 277/62, 63, 65, 134

[56] References Cited
UNITED STATES PATENTS

| 1,354,192 | 9/1920 | Howe................................. 277/134 |
| 3,565,447 | 2/1971 | Goetze................................ 277/59 |
| 3,622,164 | 11/1971 | Herbert.............................. 277/134 |

*Primary Examiner*—Herbert F. Ross
*Assistant Examiner*—Robert I. Smith
*Attorney*—Alfred W. Breiner

[57] ABSTRACT

This invention relates to a device for air-tightly fitting a rotary shaft, for example, for an anode in a rotary opposite cathode X-ray tube whereby it is made possible to remarkably elongate the life of each packing by reducing the wear of the packing without causing a leakage by reducing the pressing contact force of the packing with a centrifugal force.

1 Claim, 2 Drawing Figures

ROTARY SHAFT AIR-TIGHTLY FITTING DEVICE

This invention relates to an air-tightness holding device for fitting and passing a rotary shaft, for example, for an anode in a rotary opposite cathode X-ray tube through an air-tight wall so as to be connected with an outside driving source.

In such device, an oil low in the viscosity is contained between two annular packings through which is fitted and passed a rotary shaft and a spiral concave groove is made on the shaft.

An object of the present invention is to provide such device for air-tightly fitting a rotary shaft whereby the wear of each packing in a shaft sealing device is reduced as is mentioned above.

Figure 1:
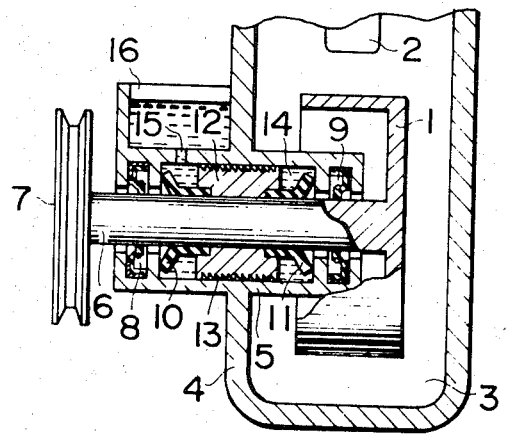
FIG. 1 is a vertically sectioned view of an embodiment of a device according to the present invention.
Figure 2:
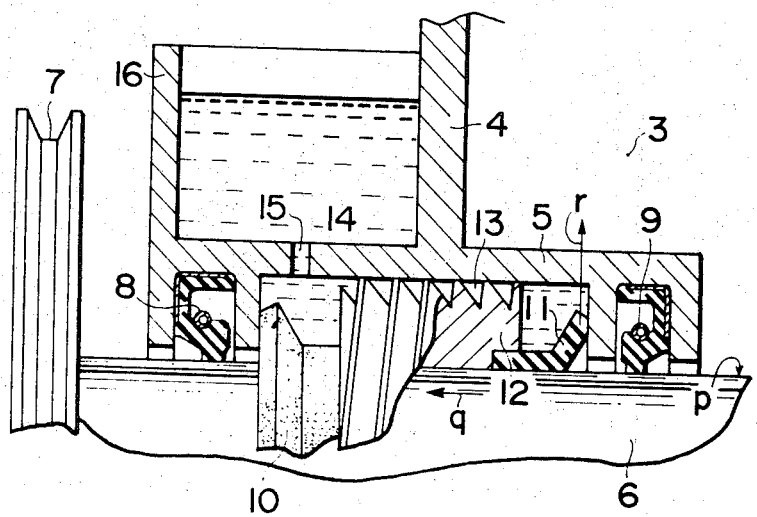
FIG. 2 is a partly magnified view of FIG. 1.

FIG. 1 is a vertically sectioned view of an embodiment of the present invention as applied to a rotary opposite cathode X-ray tube and FIG. 2 is a magnified view of a part of FIG. 1. An air-tight chamber 3 containing a cylindrical rotary anode 1 and an electron radiating cathode 2 provided opposite a part of the peripheral side surface of the anode 1 is connected to a high vacuum exhaust pump. A cylindrical bearing part 5 is formed in an air-tight wall 4 in this air-tight chamber 3 and a rotary shaft 6 of the above mentioned anode 1 is fitted and passed through said bearing part 5 and has a pulley 7 fixed to its free end. That is to say, the pulley 7 is connected with an electric motor so as to rotate the anode 1 at a high speed. The shaft 6 is held by ball bearings 8 and 9 arranged at both ends of the above mentioned cylindrical bearing part 5. Therefore, when electron rays are projected from the cathode 2 onto the peripheral side surface of the anode 1, X-rays will be generated from said anode. In such X-ray tube, two annular packings 10 and 11 formed of rubber or the like are fixed between the bearings 8 and 9 on the rotary shaft 6 and are opposed respectively to the atmosphere and the air-tight chamber 3 by pressing flanges made by projecting the outside surfaces of the annular packings 10 and 11 toward the inside of the cylindrical bearing part 5 into contact with a part of the air-tight wall 4. Further, a cylindrical body 12 closely fitted to the inside surface of the cylindrical bearing part 5 or therefore to the air-tight wall 4 is provided between the above mentioned two packings 10 and 11, is fixed to the shaft 6 and has a spiral concave groove 13 formed on the peripheral surface. That is to say, as a cylindrical sealed chamber is formed between the packings 10 and 11 arranged in both end parts of the above-mentioned spiral concave groove 13, this sealed chamber is filled with an oil 14 low in the viscosity and vapor pressure and the oil between the packing 10 opposed to the atmosphere on the pulley side and the spiral concave groove 13 is connected with an oil tank 16 in the atmosphere through a hole 15.

In the above described device, when the shaft 6 is rotated at a high speed in the direction indicated by the arrow $p$ in FIG. 2, the oil having entered the spiral concave groove 13 will be pushed in the direction indicated by the arrow $q$. Therefore, when the pushing force is larger than 1 atmosphere, the oil between the packing 11 opposed to the vacuum air-tight chamber 3 and the above mentioned spiral groove 13 will be sucked out into the oil tank 16 and will be equilibrated while the end of the oil is in a proper position in the groove 13 so that the oil chamber between the above mentioned packing and the spiral groove 13 may be vacuum. As the packing 11 is fixed to the shaft 6, it will rotate at a high speed together with this shaft. Therefore, such centrifugal force as is shown by the arrow $r$ in FIG. 2 will act on the above mentioned packing 11 and, by a component of this centrifugal force, said packing will be separated from the air-tight wall or its pressing contact force will be remarkably reduced. Further, even in case the force applied to the oil by the spiral groove 13 is smaller than 1 atmosphere, the oil pressure between said spiral groove 13 and packing 11 will become lower than 1 atmosphere correspondingly to the above mentioned force. At the same time, the force with which the packing 11 is pressed into contact with the air-tight wall will be reduced by the centrifugal force. That is to say, in case the shaft 6 is stopped, an oil pressure of 1 atmosphere will be applied between the packing 11 and spiral groove 13 and the above mentioned packing will be pressed into contact with the air-tight wall with a strong force to prevent the oil from leaking into the air-tight chamber. When the shaft 6 rotates, the above mentioned oil pressure will reduce and, at the same time, the pressing contact force of the packing will be reduced by the centrifugal force. Therefore, there will be no fear of the oil leaking into the air-tight chamber, the friction between the packing and air-tight wall will reduce, therefore the wear of the packing will be remarkably reduced and its life will elongate. By the way, the packing 10 opposed to the atmosphere has no pressure difference between the inside and outside of it and therefore may well be in contact with the air-tight wall so lightly as to prevent the flow of the oil under its own weight. Therefore, this packing 10 may be provided, for example, with a metallic core to prevent the action of a centrifugal force and may be in contact with the air-tight wall always under a substantially constant small pressure so that the wear may be prevented. Further, as the space between the rotary shaft 6 and air-tight wall 4 is always filled at least partly with an oil low in the viscosity, the air-tightness can be perfectly held.

As described above, in the device of the present invention, annular packings are fitted to a rotary shaft and are pressed into contact with an air-tight wall and a spiral concave groove is made on said rotary shaft and is closely fitted to the air-tight wall. Therefore, with the pumping action of the above mentioned spiral groove, the packing part can be made vacuum or at least the oil pressure in said part can be reduced, further, with the centrifugal force, the pressing contact force of the packing can be reduced and thus, without producing a leakage, the wear of the packing can be reduced and its life can be elongated.

What is claimed is:

1. A rotary shaft air-tightly fitting device which comprises an air-tight wall, a rotary shaft closely fitted and passed through said air-tight wall, a spiral concave groove made on the peripheral side surface of said rotary shaft in the passing part of the rotary shaft and two annular packings arranged respectively at boty ends of said spiral concave groove and opposed on the outsides respectively to the atmosphere and the air-tight chamber, said first annular packing opposed to the above mentioned air-tight chamber being fixed to the above mentioned rotary shaft and pressed on the outside surface into contact with the above mentioned air-tight wall, the space between the above mentioned two packings being filled with an oil low in the viscosity and the oil between said second annular packing opposed to the atmosphere and the above mentioned spiral concave groove being connected with the atmosphere.

* * * * *